United States Patent [19]

Fields et al.

[11] Patent Number: 5,989,052
[45] Date of Patent: Nov. 23, 1999

[54] ELECTRICAL OUTLET SAFETY COVER AND CORD CONNECTOR

[76] Inventors: Kenneth N. Fields, 310 W. 15th St., Clifton, Tex. 76634; William C. Metker, P.O. Box 116, Meridian, Tex. 76665

[21] Appl. No.: 09/098,831

[22] Filed: Jun. 17, 1998

[51] Int. Cl.⁶ .................................................. H01R 13/62
[52] U.S. Cl. ................................................. 439/373; 439/144
[58] Field of Search ................................. 439/373, 143, 439/144, 147, 369, 142, 135, 367, 299, 300, 374, 353, 277, 320, 133; 174/67

[56] References Cited

U.S. PATENT DOCUMENTS

| | | | |
|---|---|---|---|
| 2,406,030 | 8/1946 | O'Brien | 439/373 |
| 3,656,083 | 4/1972 | Brook | 439/147 |
| 4,045,108 | 8/1977 | Olsen | 439/373 |
| 4,072,382 | 2/1978 | Reschke . | |
| 4,221,449 | 9/1980 | Shugart, Jr. | 439/369 |
| 4,671,587 | 6/1987 | Lerner et al. | 439/142 |
| 4,691,974 | 9/1987 | Pinkerton et al. | 439/147 |
| 4,718,856 | 1/1988 | Pinkerton et al. | 439/147 |
| 4,851,612 | 7/1989 | Peckham | 174/67 |
| 4,875,874 | 10/1989 | Windsor, Jr. | 439/364 |
| 4,895,527 | 1/1990 | Brown et al. | 439/373 |
| 4,917,625 | 4/1990 | Haile | 439/358 |
| 4,981,439 | 1/1991 | Piedmont | 439/135 |
| 5,017,148 | 5/1991 | Buckshaw | 439/148 |
| 5,049,086 | 9/1991 | Slaven | 439/143 |
| 5,069,634 | 12/1991 | Chiarolanzio | 439/353 |
| 5,129,839 | 7/1992 | VanSkiver | 439/367 |
| 5,139,438 | 8/1992 | Gaffney | 439/269 |
| 5,174,773 | 12/1992 | Jones | 439/147 |
| 5,179,044 | 1/1993 | Muromachi et al. | 439/369 |
| 5,195,901 | 3/1993 | Correnti | 439/147 |
| 5,252,083 | 10/1993 | Correnti | 439/147 |
| 5,264,662 | 11/1993 | Kennedy | 174/67 |
| 5,272,281 | 12/1993 | Bouley | 174/67 |
| 5,288,945 | 2/1994 | Bruce | 174/67 |
| 5,370,542 | 12/1994 | Beach et al. | 439/148 |
| 5,408,046 | 4/1995 | Vandeventer | 174/67 |
| 5,454,728 | 10/1995 | Jack | 439/277 |
| 5,575,677 | 11/1996 | Buckner et al. | 439/373 |
| 5,584,720 | 12/1996 | Elswick | 439/369 |
| 5,589,665 | 12/1996 | Scamacca | 439/147 |
| 5,685,732 | 11/1997 | Lane | 439/369 |

*Primary Examiner*—Paula Bradley
*Assistant Examiner*—Alexander Gilman
*Attorney, Agent, or Firm*—Chase & Yakimo, L.C.

[57] ABSTRACT

An apparatus is disclosed for covering an electrical wall outlet and for maintaining the connection of electrical plugs thereto or to another electrical socket. The apparatus includes a cover plate presenting socket openings and at least one cap for housing a cord/plug assembly, the cap having a pair of legs with flanges attached to free ends thereof. The cover plate includes a pair of opposed slots about each socket opening, each slot having a first channel for receiving the appropriately aligned legs and flanges therein. A cap is secured to a cover plate by rotating the cap in a clockwise direction until the legs reach a terminal channel at which a portion of the plate overlies the flanges to preclude removal of the flanges from the channel. A cap is removable from the cover plate only by placing inward pressure on both legs while simultaneously rotating the cap for movement of the legs back to the first channel. The apparatus further includes a second cap similar to the first cap which includes a face plate having slots as in the cover plate. Each cap can house a cord/plug or socket assembly which can be locked together by inserting the legs of the first cap into the slots of the second as above described. As such ready access to the juncture of a socket/plug assembly of two wires is precluded. Alternatively, caps having completely closed ends may be engaged with the cover plate to cover an outlet socket which is not in use.

20 Claims, 12 Drawing Sheets

ELECTRICAL OUTLET SAFETY COVER AND CORD CONNECTOR

BACKGROUND OF THE INVENTION

This invention relates to a device for covering electric outlets and, more particularly, to an apparatus which protects a young child from potential electric shock from an open outlet and prevents unintentional removal of an electrical plug from an outlet or another electrical plug.

Young children too frequently experience electrical shocks as a result of curiously placing their fingers or other objects into electrical outlets. Such shocks result in serious injury and sometimes, unfortunately, in death. A related problem is that electrical plugs often do not fit tightly into existing wall outlet receptacles, causing frequent disengagement of power to electrically powered devices when the plug falls out of the outlet. The inconvenience of power disengagement is also experienced when one power cord becomes loose or disconnected from a second cord such as an extension cord.

Several devices have been proposed which can either protect an individual from electric shock associated with a wall outlet, can prevent a power cord from unintentional removal from a wall outlet, or can prevent unintentional disengagement of the plug/socket juncture of two power cords. Although assumably effective in operation, such known devices are either complex in construction, difficult to use, or do not solve all of the problems described above.

For example, in U.S. Pat. No. 5,589,665 to Scamacca, an outlet cover is disclosed having a shell which protects a user from electric shock while preventing unintentional removal of a plug from a wall outlet. The shell, however, is secured to a special wall outlet through registration of a pin, slot, and aperture configuration which is not intuitive and is difficult to operate by persons unfamiliar with the device or who experience diminished dexterity. Further, a user is required to apply pressure to a specific location on the shell although a clear view of the attachment mechanism is not afforded.

Similarly, other known devices present relatively complex constructions or have attachment mechanisms which are not well suited for quick and easy attachment and removal by adult persons having limited dexterity. Also, it is desirable to have outlet cover apparatus which also houses and maintains the socket/plug connection between two electrical cords.

It is therefore desirable to have an apparatus which can protect young children from electric shocks caused by the insertion of fingers or other objects into an electrical outlet. It is also desirable to have an apparatus which prevents unintentional removal of a plug from an electrical outlet or from another socket at an end of an extension cord.

SUMMARY OF THE INVENTION

In response thereto, we have invented a safety device including a novel cover plate easily attached to a traditional electrical outlet. The cover plate presents socket openings as well as a pair of opposed slots surrounding each opening. Safety caps cover the sockets, each cap having a pair of resilient legs with tab/flanges attached thereto which extend beyond an end of the cap. A cap is secured to a cover plate by aligning and inserting the legs into a first course/channel formed in each slot and then rotating the cap clockwise through a second course/channel until the legs are received into a third channel in each slot. When the legs are in the third channel, the cap cannot be removed from the cover plate through simple counterclockwise rotation or by pulling on the cap. The cap is only removable from the cover plate by placing inward pressure on both legs while simultaneously rotating the cap with a counterclockwise twisting motion so as to move the legs back to the first course/channel.

A first and second modified cap may also be utilized in combination to house and lockingly secure the juncture of two electrical cords. The second cap presents a face plate having slots therein similar to the cover plate slots described above. The face plate slots surround an open end of the second cap for receiving the legs and flanges of the first cap therethrough. The first cap is secured to the second cap in a similar manner as secured to a cover plate, thereby preventing the disengagement of electrical cords and the plug/socket combination housed within the caps.

Alternatively, the first cap can presents a completely closed end so as to completely cover a socket to prevent electric shock when the outlet is not in use.

It is therefore a general object of this invention to provide an apparatus which will reduce the risk of electrical shock to children caused by contact with an electrical outlet.

Another object of the invention is to provide an apparatus, as aforesaid, which includes a modified cover plate that is easily attachable to the face of a conventional electrical outlet without precluding outlet access.

Still another object of this invention is to provide an apparatus, as aforesaid, which includes a cap that is attachable to a cover plate and removable from a cover plate only upon simultaneously placing pressure on opposed cap location and rotating the cap.

A further object of this invention is to provide an apparatus, as aforesaid, which can prevent the unintentional disengagement of an electrical plug from a wall socket or from another connecting electrical socket.

Other objects and advantages of this invention will become apparent from the following description taken in connection with the accompanying drawings, wherein is set forth by way of illustration and example, now preferred embodiments of this invention.

DESCRIPTION OF THE PREFERRED EMBODIMENT

Figure 1:
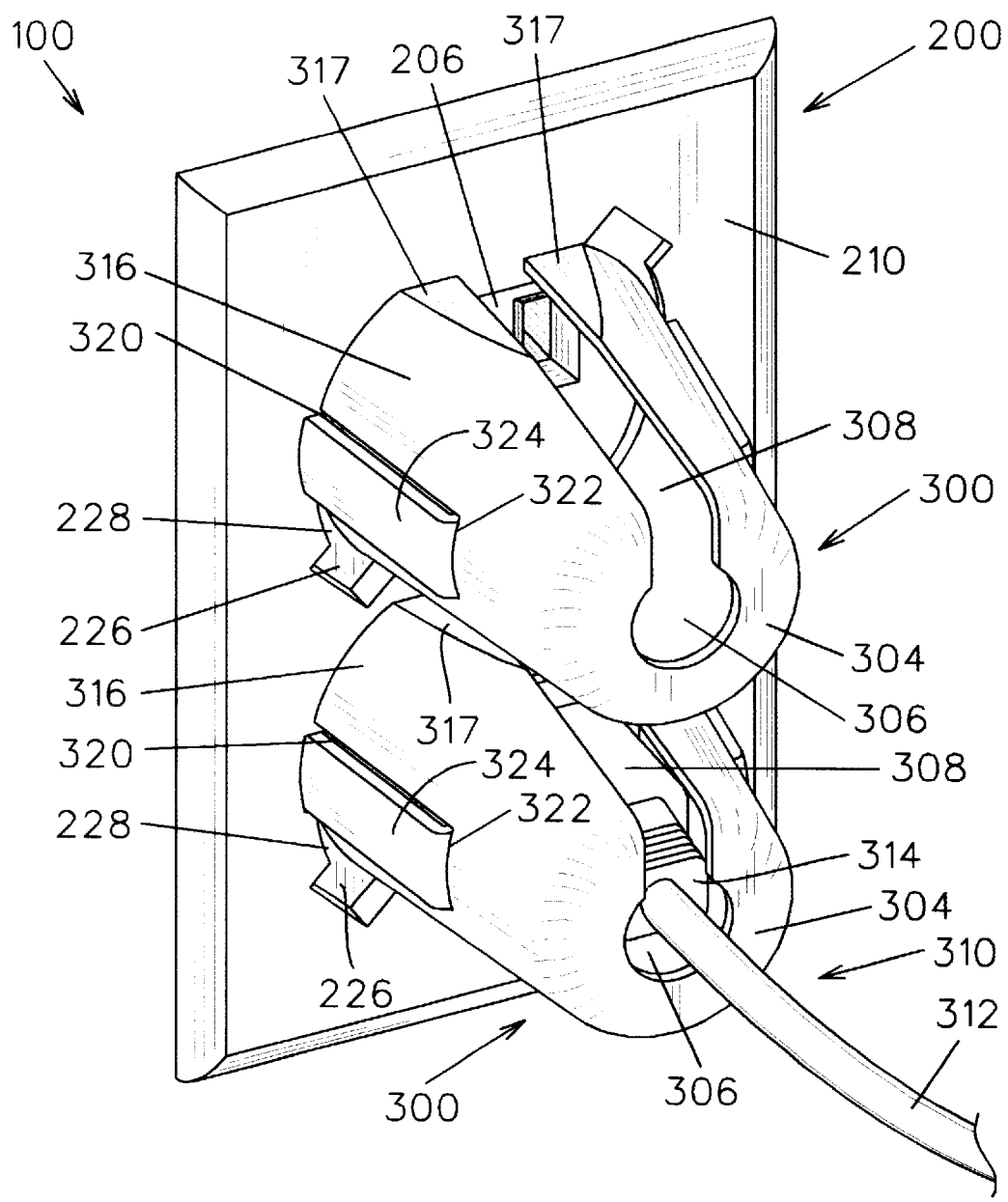
FIG. 1 is a perspective view of the system apparatus showing the cover plate atop a wall outlet with a pair of caps in place and one plug engaged to a wall outlet.
Figure 2:
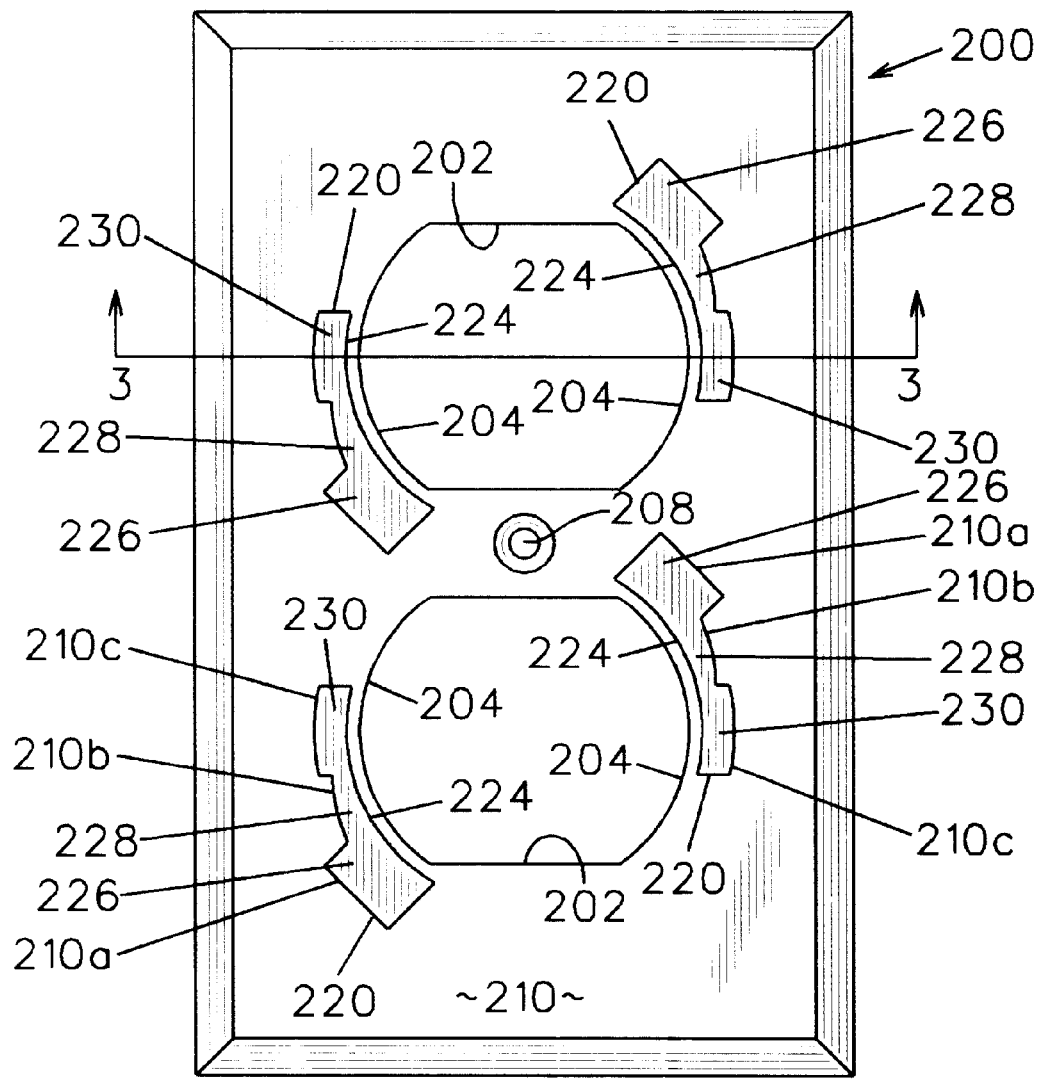
FIG. 2 is a front view of the cover plate of the apparatus of FIG. 1 with caps and plug removed.
Figure 3:
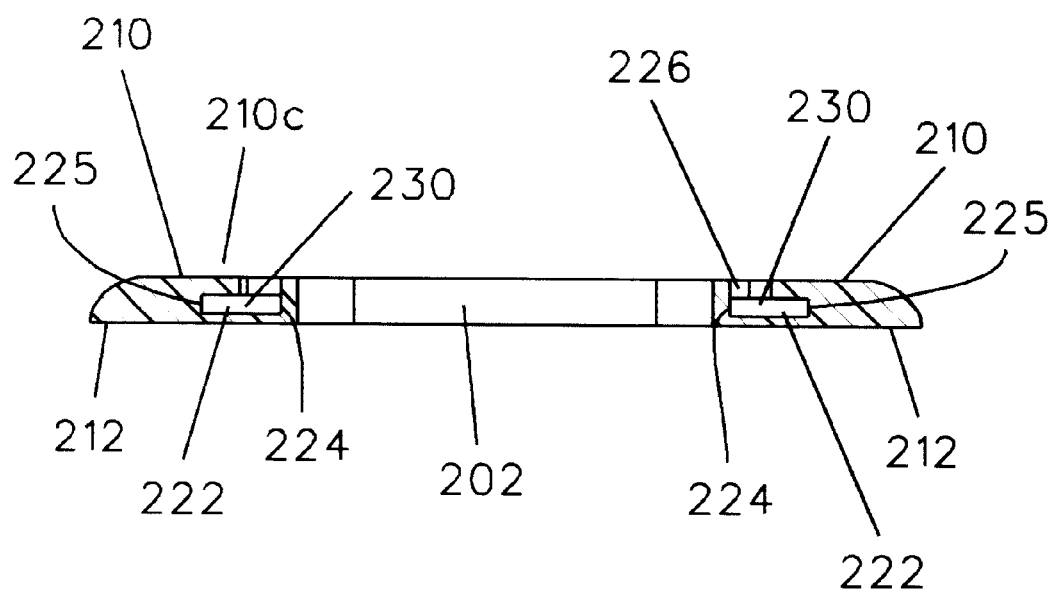
FIG. 3 is a sectional view of the cover plate taken along plane 3—3 of FIG. 2 and showing the third course of the cover plate slots.
Figure 4:
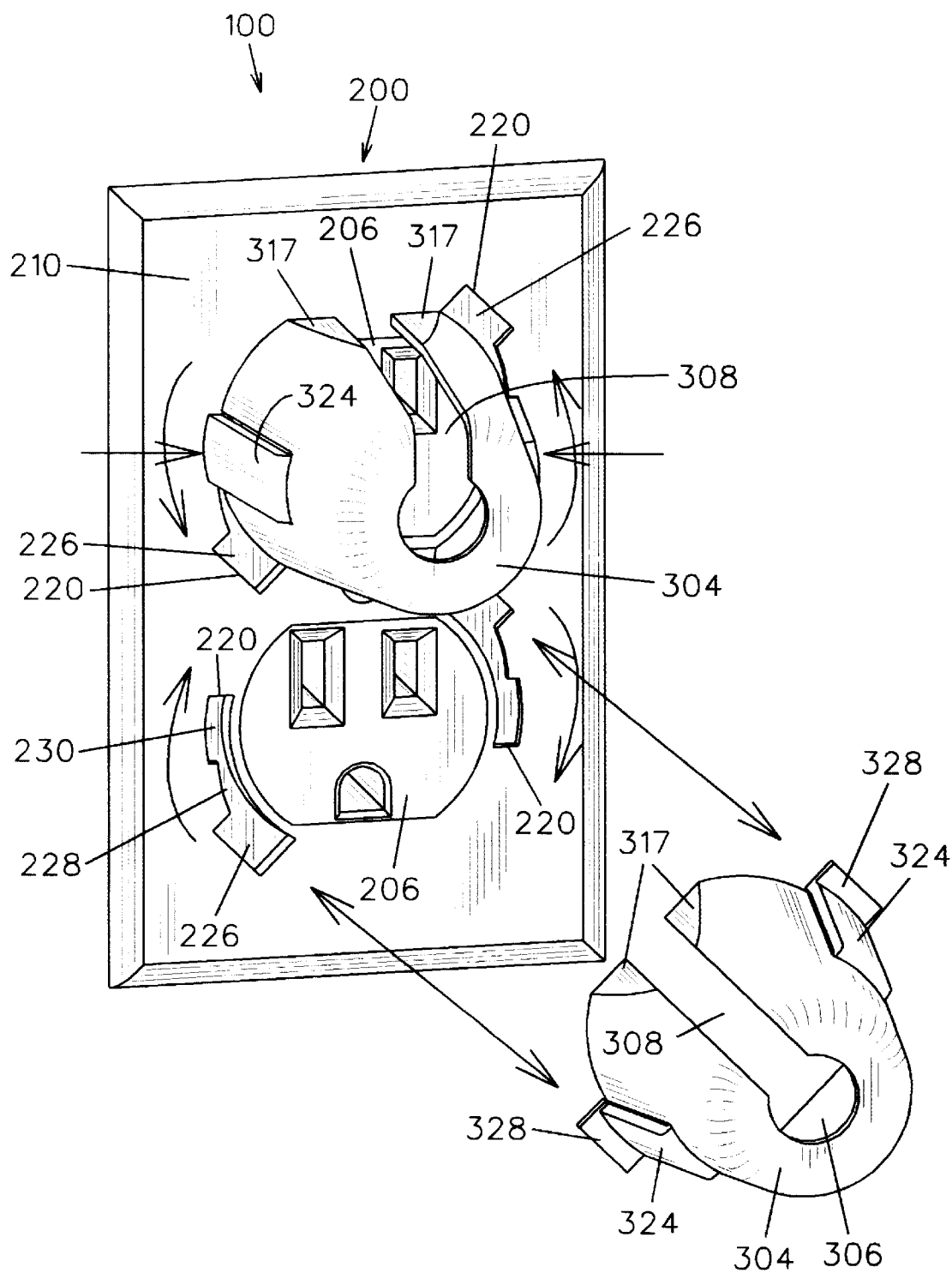
FIG. 4 is a perspective view of the apparatus of FIG. 1 with the plug removed and one cap exploded from the slots in the cover plate.

Turning more particularly to the drawings, FIGS. 1–4 show the safety cover apparatus 100 having a generally rectangular cover plate 200, the cover plate 200 having the traditional openings 202 (FIG. 2) through which the female sockets 206 of the conventional wall outlet extend (FIG. 4). The cover plate 200 includes an aperture 208 (FIG. 2) between the socket openings 202 through which a screw can be inserted for mating with the threaded aperture presented by a conventional electrical outlet assembly. As best shown in FIGS. 2 and 3, cover plate 200 presents front and rear surfaces 210, 212. The front surface 210 of the cover plate 200 includes a pair of oppositely disposed slots 220 adjacent to each socket opening 202, the inner wall 224 and outer wall 225 of each slot 220 maintaining a consistent curvature. Portions of the plate surface 210 extend from top of slot wall 225 and overlie slot 220 to present an outer wall structure for a purpose as to be later described. The inner side wall 224 of the slots 220 are spaced in parallel from side edges 204 of the socket openings 202.

Figure 7:
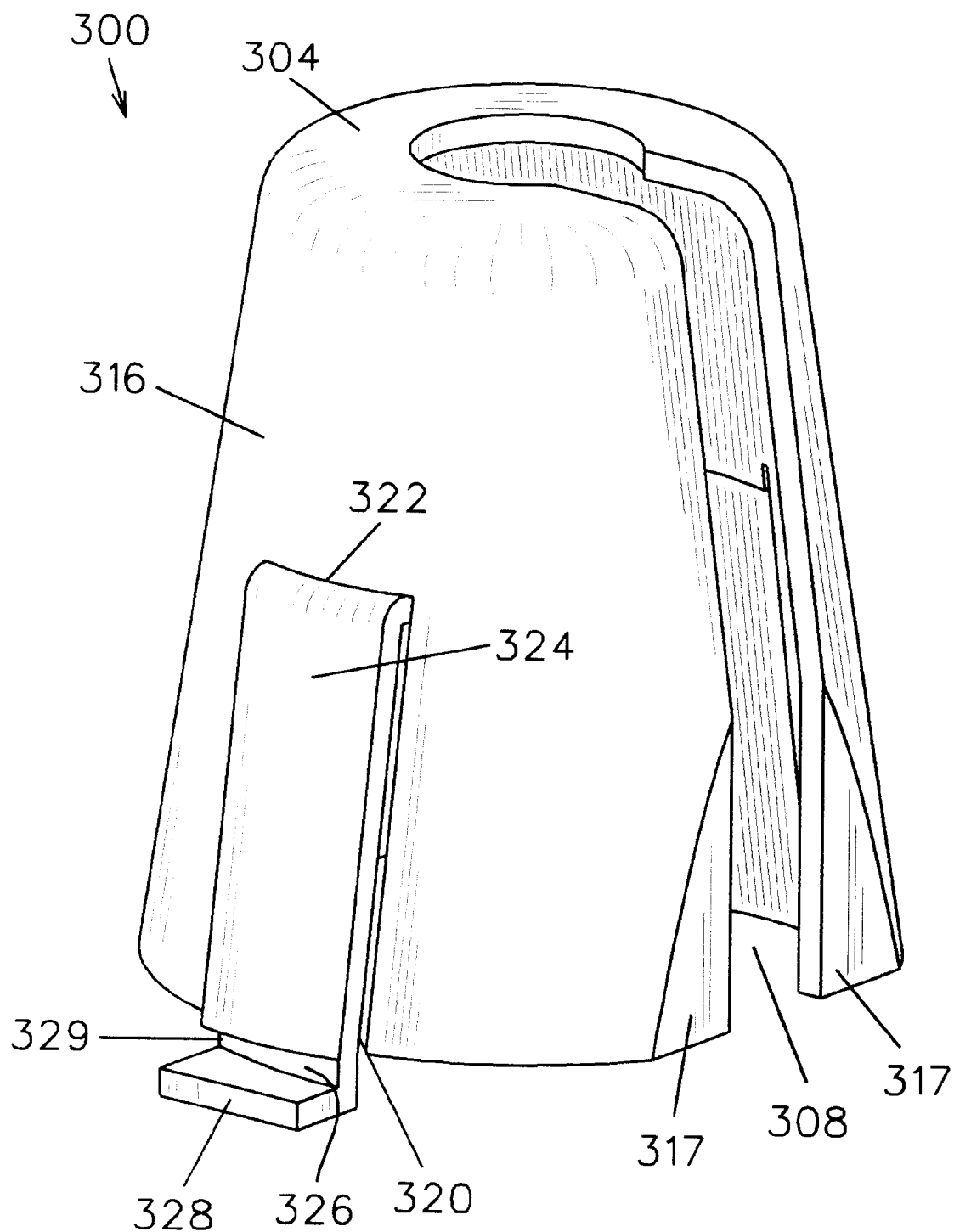
FIG. 7 is a perspective view on an enlarged scale of the first cap of FIG. 5A.

As particularly shown in FIGS. 1 and 4, the apparatus 100 further includes a pair of caps 300 in the form of generally cylindrical housings. Each cap 200 includes an open end 302 and a smaller opposed end 304. A slot 308 is presented in the side wall 316 of the cap 300 between the open end 302 and opposing end 304. The cylindrical side wall 316 of each cap includes oppositely disposed flattened portions 317, 317a (FIG. 7) adjacent open end 302 thereof which enable mounting of adjacent caps 300 to the cover plate 200. It is understood that the flattened portions preclude contact between the caps when the caps are mounted to the cover plate. Each cap 300 is of sufficient inside diameter to enable a plug 310 to be housed therein, the cord 312 proper being inserted through the slot 308 and extended through the opening 306 in the opposed cap end 304 (FIG. 1). The larger open end 302 of the cap 300 surrounds socket 206 which allows the plug 314 to be inserted into a female socket 206 of the electrical outlet. The opposing smaller end 304 prevents the plug 314 from sliding therethrough upon pulling cord 312.

Figure 5A:
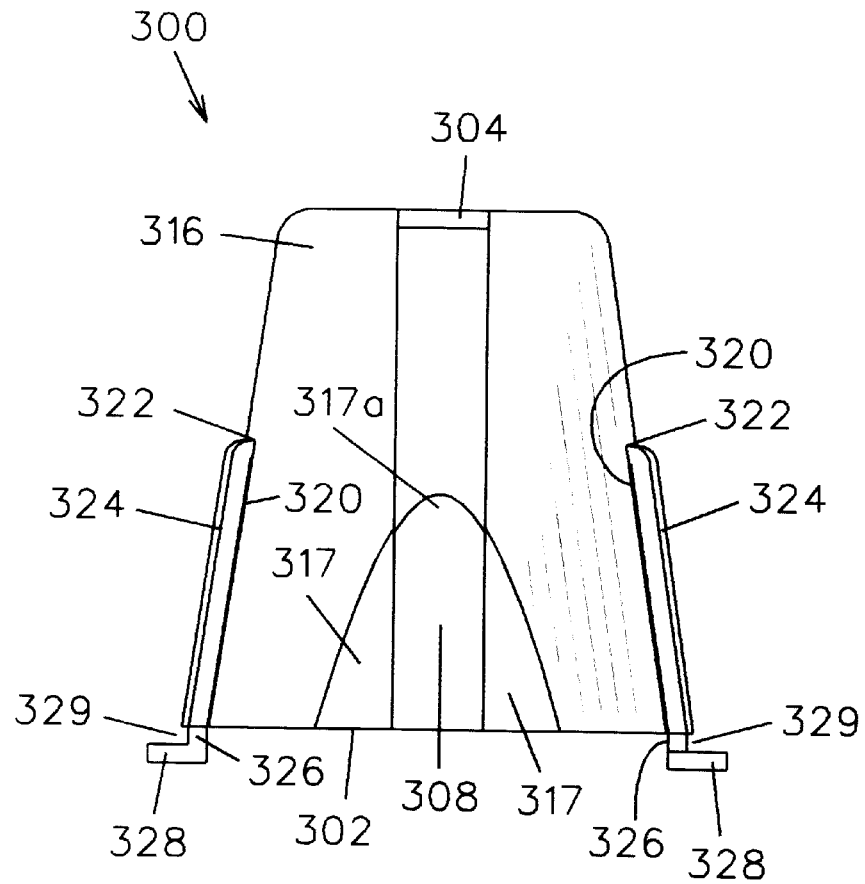
FIG. 5A is a side view of a first cap.
Figure 5B:
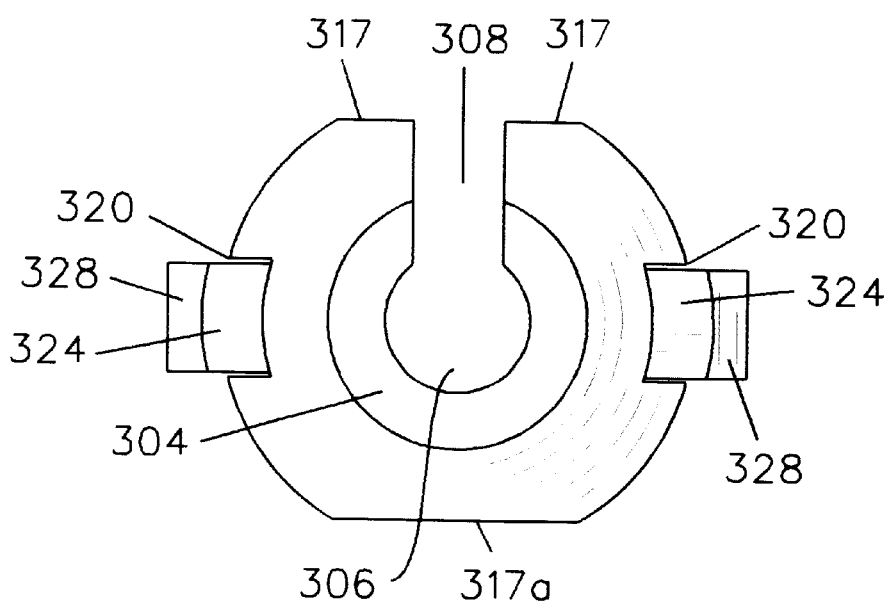
FIG. 5B is a top view of the first cap of FIG. 5A.
Figure 6A:
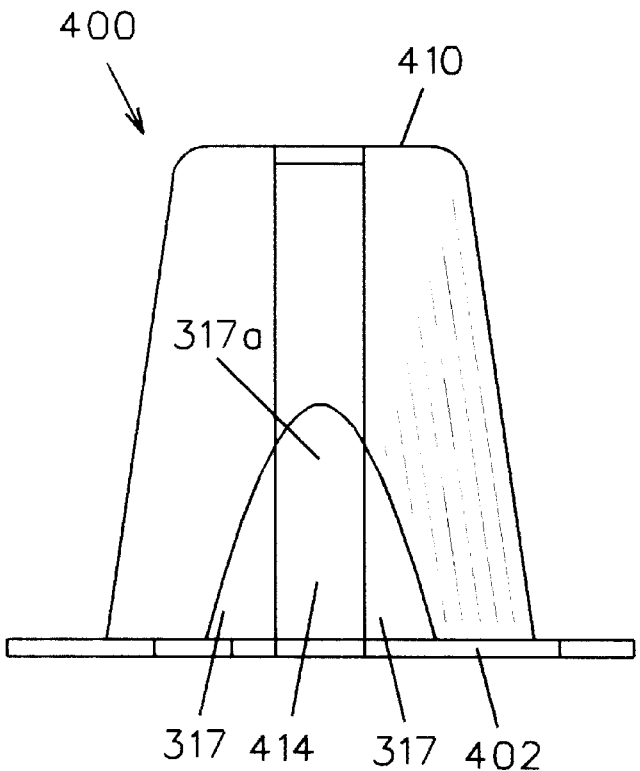
FIG. 6A is a side view of a second cap for engagement with a first cap as shown in FIG. 9.
Figure 6B:
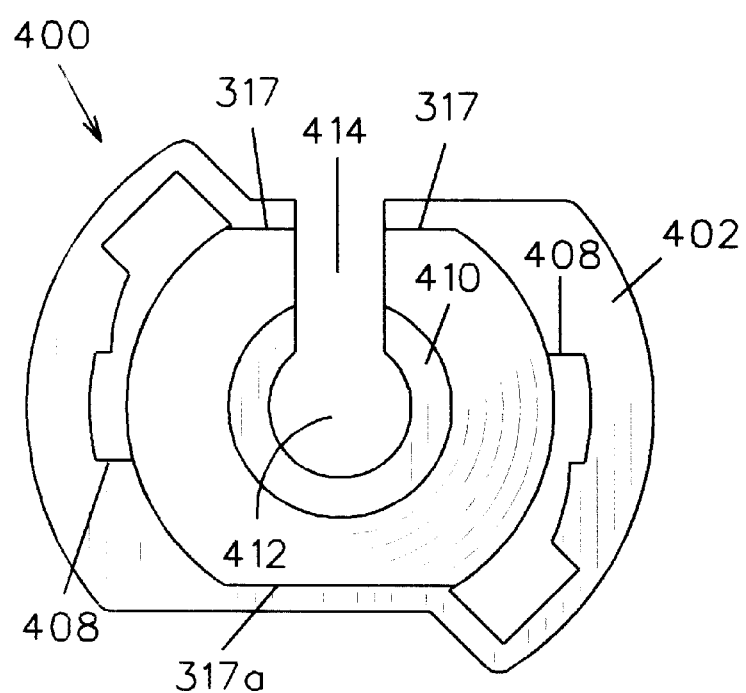
FIG. 6B is a bottom view of the second cap of FIG. 6A showing the surrounding rim and slots therein.

As best shown in FIGS. 5A and 5B, the side wall 316 of each cap 300 presents a pair of oppositely disposed slots 320 therein with resilient legs 324 attached to an upper end 322 of each slot 320. Each leg 324 extends along slot 320 and presents a lower leg end 326 at a point slightly beyond the open end 302 of the cap 300. The lower leg end 326 presents a normally extending foot/flange 328 which forms a juncture at 329. Juncture 329 is designed to engage edges of the front surface 210 of plate which overlie portions of the slot 220 as to be described later. The lower leg 326/slot 320 configuration regulates the depression of the resilient legs 324 from a normal position with the legs outside the cap 300 slots 320 to a position with the legs 324 inside slots 320.

The slots 220 in the cover plate 200 are adapted to receive and secure the lower ends 326 of legs 324 and flanges 328 of a cap 300 therein. Each slot 220 presented in the cover plate 200 includes a first course/channel 226 of sufficient dimension between the inner 224 and outer side walls 225 to receive a flange 328 and lower portion of a leg 324 therein when legs 324 are in a normal, non-depressed position. The first course/channel portion 226 is in communication with a second course/channel portion 228 defined by a portion 210b of cover plate surface 210 which overlies slot 220 to present a reduced channel width. Thus, each leg 324 must be depressed into its slot 320 upon clockwise rotation of the cap 300 for initial movement of the legs 324 into this second channel 228. During leg movement through the second channel the edge of the cover plate portion 210b which overlies the second course 228 bears against the lower leg juncture 329 which further depresses each leg 324 from a normal position into the slot 320. Upon continued clockwise rotation of the cap 300, each leg 324 will continue to be depressed into its slot as it travels along the second channel portion 228 until the lower end 328 of leg 324 enters a third course/channel 230 of the slot 220 as defined by a portion 210c of cover plate surface 112 which overlies slot 220. The third channel 230 presents an appropriate width such that each depressed leg 324 is allowed to return to its normal non-depressed position. The surface 210c of plate 200 extends over the third channel portion 230 and atop flange 328 to prevent pulling of the leg ends 326 from this third course 230 and thus cap 300 from the cover plate 200. Further, the juncture of the second channel portion 210b and third channel portion 210c presents an edge which bears against legs 324 thereby preventing movement of the Legs 326 into the second channel solely by counterclockwise rotation. A bottom surface 212 of the cover plate 200 presents a bottom slot wall 222 which prevents a tab/flange 328 or any other object inserted into a slot 220, e.g. fingers, from contacting the electrical wires of the outlet.

Removal of a cap 300 from the cover plate 200 requires inward user pressure to be applied to both legs 324 of the cap 300 while simultaneously applying a counterclockwise twisting force to the cap 300. This technique properly moves the legs 324 into a depressed position within slots 320 which upon counterclockwise cap rotation moves the flanges 328 into the second channel portion 228. Further counterclockwise cap rotation causes the legs to travel through the second channel until the legs reach the first channel 226. During this second channel movement the plate surface 210b which overlies the second channel 228 bears against juncture 329 to maintain leg depression. The first channel 226 presents a width which allows the depressed legs 324 to return to their normal position. Thus, the cap 300 can thereafter be removed by pulling the cap 300 away from the cover plate 200.

Figure 8:
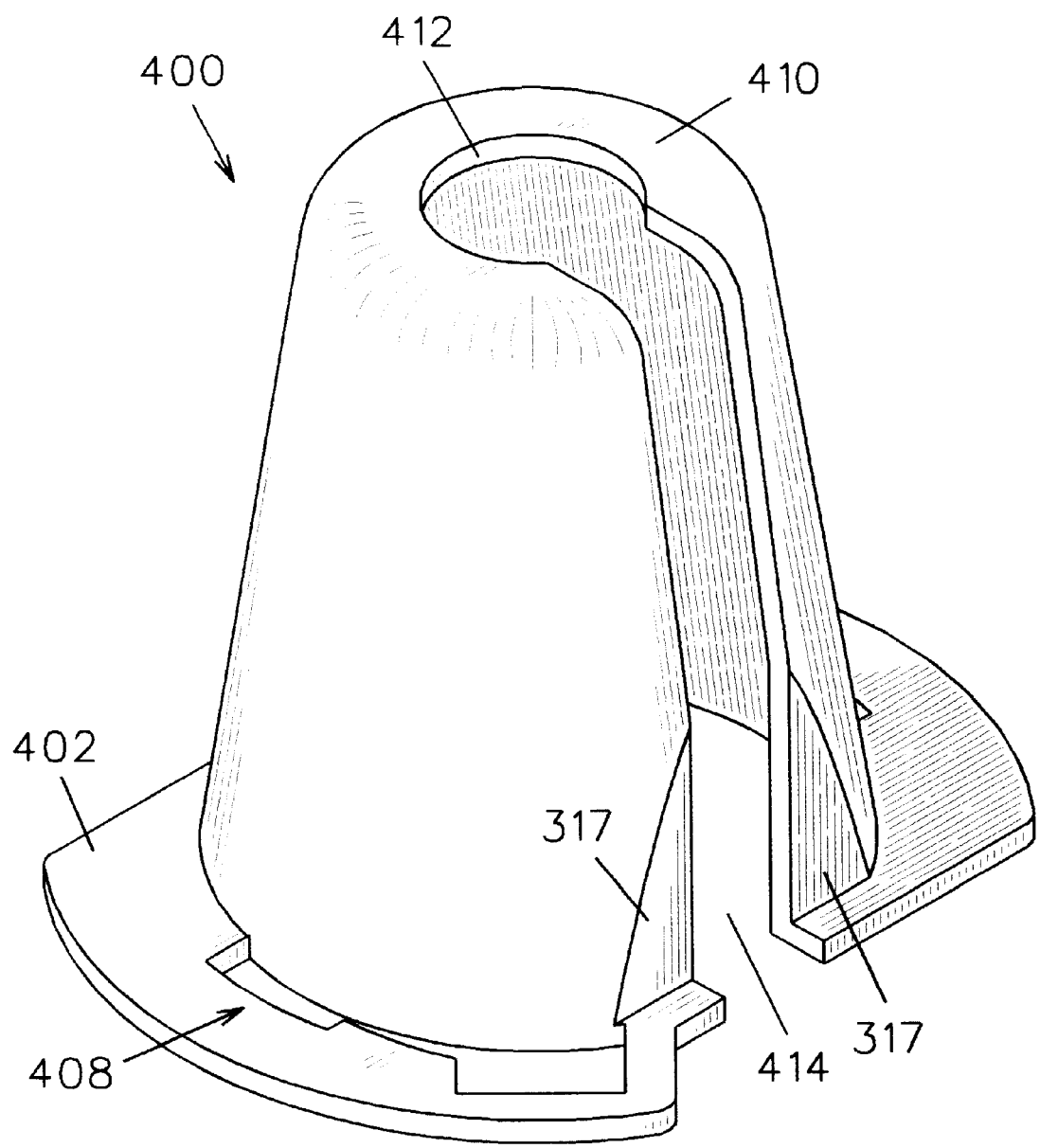
FIG. 8 is a perspective view on an enlarged scale of the second cap of FIG. 6A.
Figure 9:
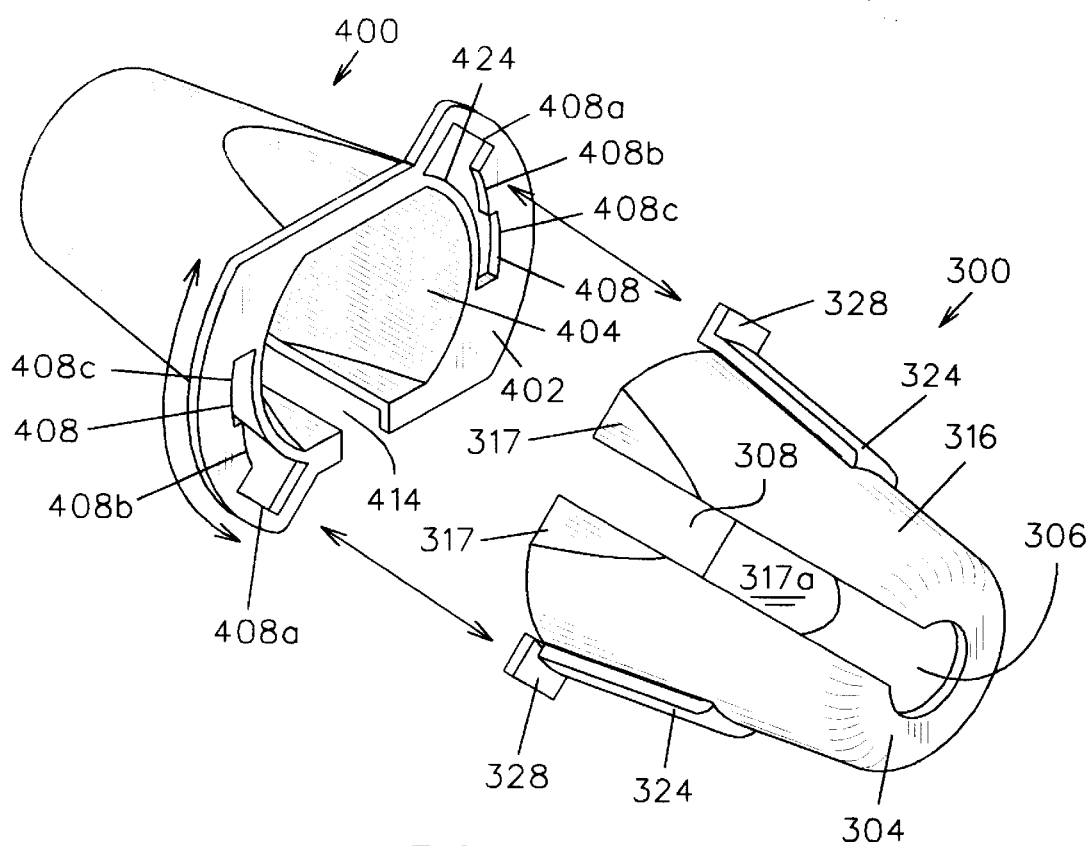
FIG. 9 is a perspective view of first and second caps prior to an attachment therebetween.

The apparatus 100 further includes a second cap 400 (FIG. 9) which can be used in combination with the above described first cap 300 to prevent the unintentional disengagement of two electrical cords at a plug/socket juncture. As more particularly shown in FIG. 9, the first cap 300 may be removably joined to the second cap 400, the second cap having a construction similar to the first cap 300 except as described below. The second cap 400 includes a rim/face plate 402 integrally attached to the open end 404 thereof, the face plate 402 presenting a pair of slots 408 therethrough adjacent the edges 406 of the open end 404 as in the cover plate 200 described earlier (FIGS. 8 and 9). Slots 408 include first, second and third courses defined by an inner edge 424 and outer edges 408a, 408b and 408c in the rim 402. The first cap 300 is joined to and released from the second cap 400 in a similar manner in which the first cap 300 may be joined to the cover plate 200. Upon insertion of the lower leg end 326 into the first course the legs 328 are depressed for movement through the second course. Edge 408b bears against legs 324 during such second course movement. Upon movement of lower legs 326 into third course 408c the depressed legs 324 return to their normal position. Thus, edge 408c overlies feet 328 which precludes removal of cap 300 from cap 400. To remove cap 400 legs 324 are depressed. Cap 300 is then rotated counterclockwise to move fee 328 back to first course 408a.

In use, a cord/socket is housed within cap 300 while a cord/plug engaged thereto is housed within cap 400 the cords proper being insertable through slots 308, 414 and closely encircled by the openings 306, 412 in the substantially closed ends 304, 410 of each cap. The substantially closed ends 304, 410 prevent the plug/socket from sliding therethrough, while open ends of the caps 302, 404 allow a male plug and female socket to be engaged. Engagement of the plug with the socket is maintained by locking the legs 324 of cap 300 into the slots 408 of cap 400 in a manner as described above.

Figure 10:
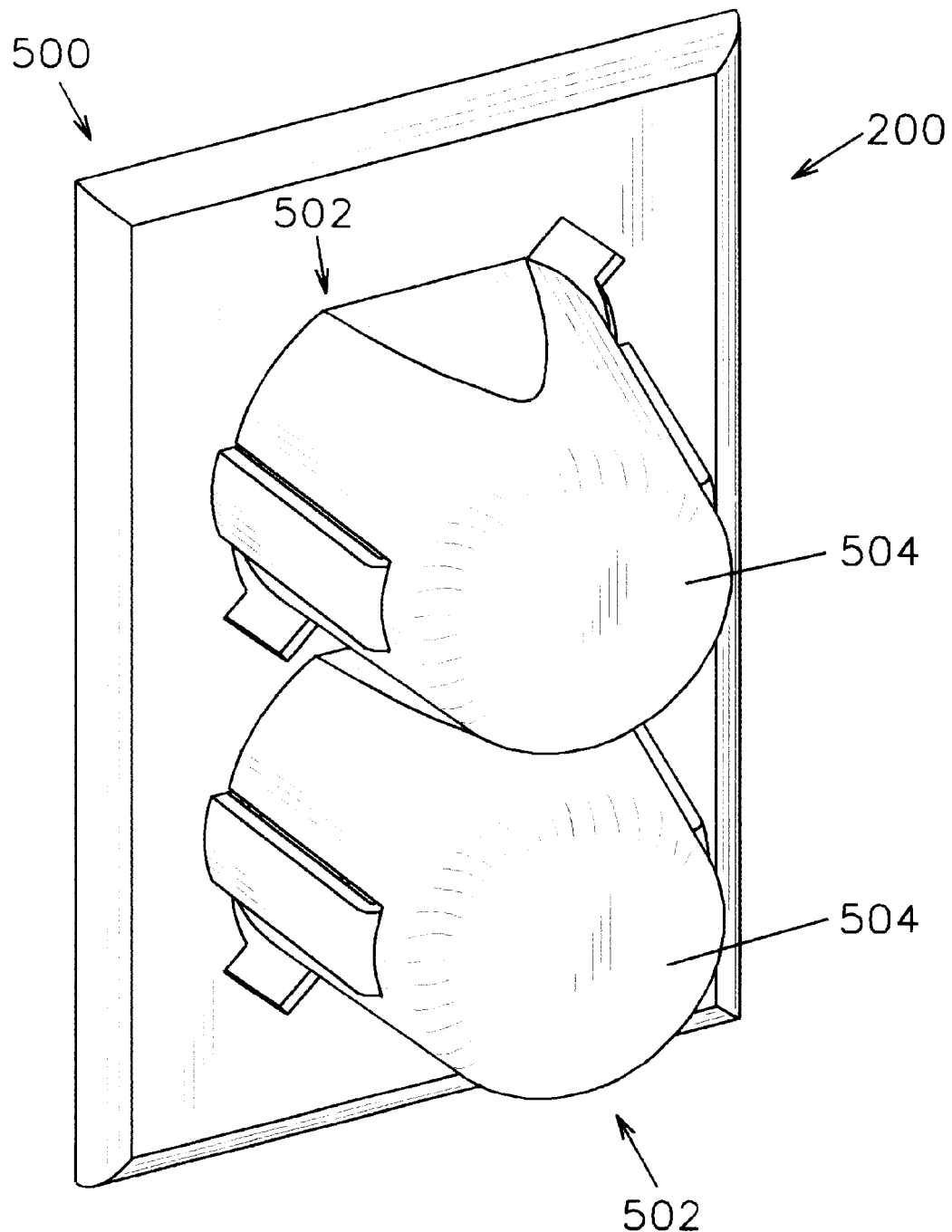
FIG. 10 is a perspective view of an alternative embodiment of the caps shown in FIG. 1.
Figure 11A:
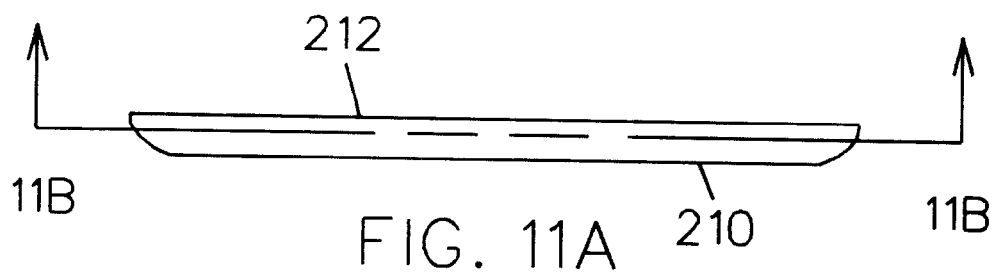
FIG. 11A is a top view of the cover plate.
Figure 11B:
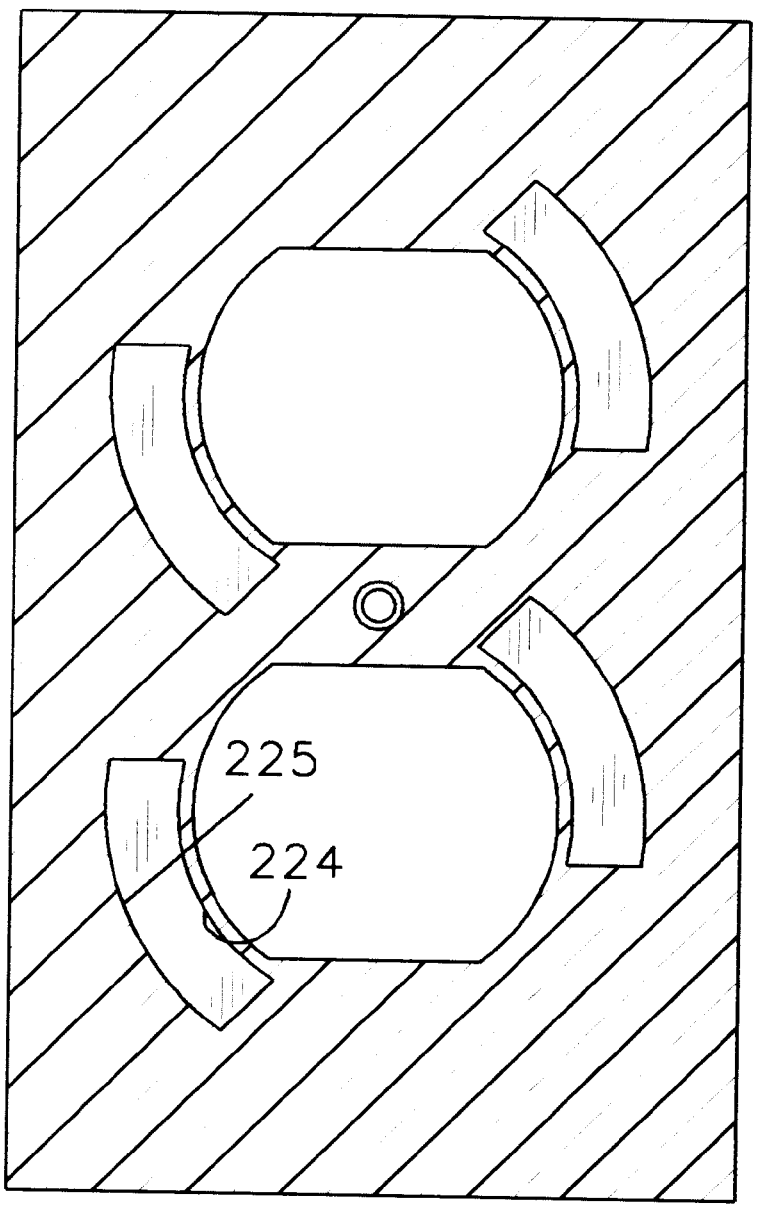
FIG. 11B is a sectional elevation view taken along lines 11B—11B in FIG. 11A and showing the slot configuration.
Figure 12:
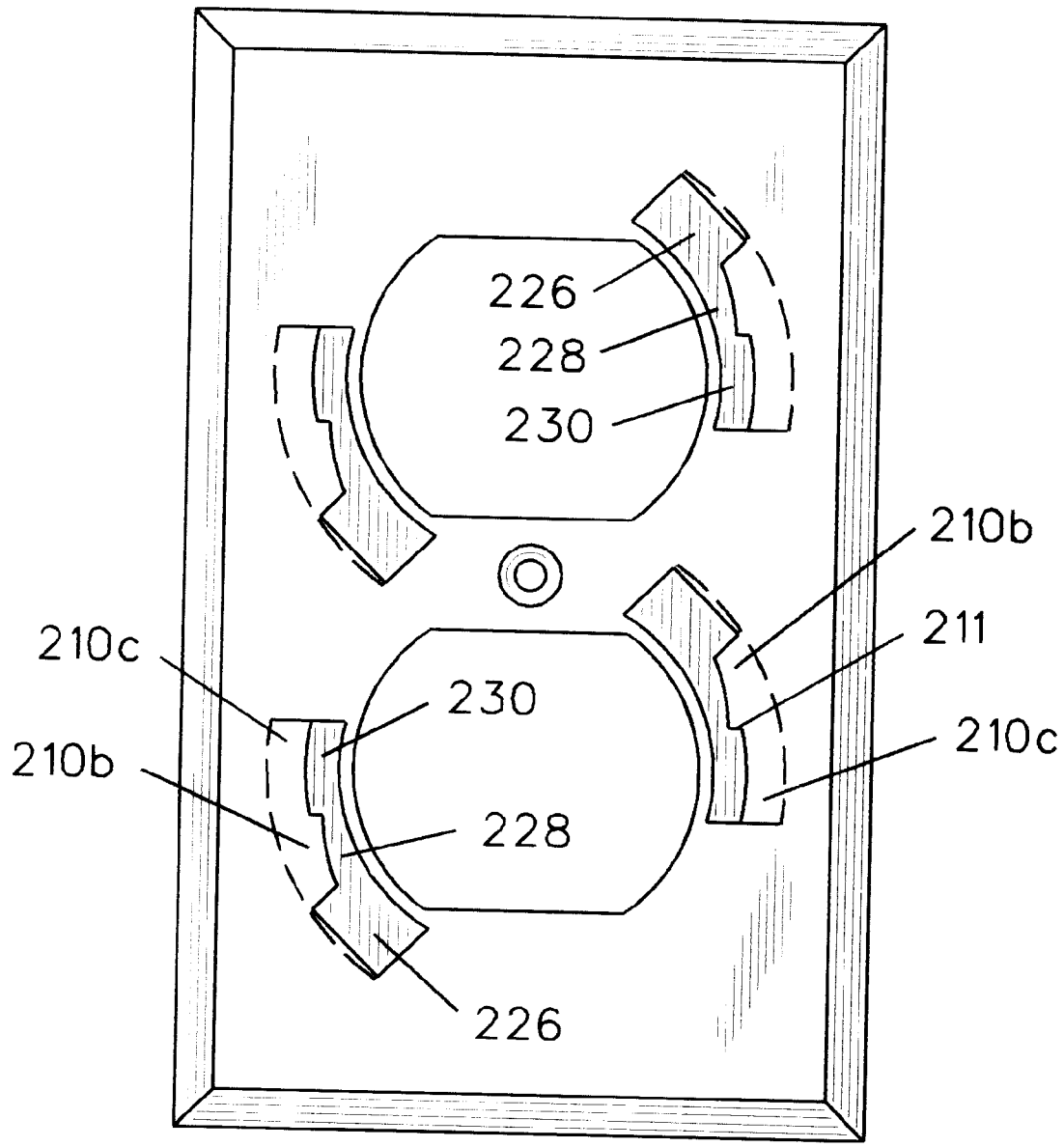
FIG. 12 is a front view of the cover plate of FIG. 11B with the front surface in place and showing the slots of FIG. 11B in hidden lines.

An alternative embodiment 500 of the apparatus shown in FIG. 10 is very similar to the apparatus 100 previously described except as noted below. Each cap 502 included in this embodiment 500 now presents a completely closed end 504 rather than a substantially closed end 304 as described earlier (FIGS. 1–5 and 7). Each completely closed cap 502 may be secured to the cover plate 200 as previously described and is useful to prevent young children from accessing electrical outlets which are not actively in use.

It is understood that the slots 220 may be otherwise formed to present the same accompanying advantages and results. For example, the overlying portion 210b may have a smooth curvature allowing for a smooth transition of the legs between the first 226 and second 228 courses so that the legs 324 need not be manually depressed for such transition. Also, the outer side wall 225 may be so configured to bear against the free end of foot/flange 328 and depress legs 324 during this transition.

Accordingly, it can be seen that the present invention can protect young children from receiving electrical shocks caused by direct or indirect interaction with an electrical outlet. The present apparatus can also prevent the unintentional disengagement of an electrical plug from an electrical outlet or from another plug.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A cover for a conventional electric outlet while receiving an electrical plug therein, the plug having a current conducting wire extending therefrom, said cover comprising:
    a cover plate adapted for attachment to an electrical outlet, said plate including an opening adapted for surrounding an electrical outlet;
    a cap having a first open end presenting a rim for surrounding the opening and a second opposed end;
    an aperture in said second opposed end of said cap adapted for extension of a wire connected to the plug therethrough;
    a slot in said cap extending between said cap rim and said cap aperture adapted for insertion of the wire connected to the plug therethrough, said cap adapted to encircle a plug in engagement with the outlet with extension of the plug wire through said cap aperture;
    a pair of resilient flanges extending from said cap, said flanges having a normal position and a depressed position;
    a pair of oppositely disposed channels in said cover plate and adjacent said cover plate opening for receiving one of said flanges therein, each channel comprising:
        a first channel course presenting first and second walls at a first spaced-apart relationship for receiving said flanges therebetween at said normal position;
        a second channel course in communication with said first channel course and presenting first and second walls at a second spaced-apart relationship for urging said resilient flanges towards said depressed position during user movement of said flanges through said second channel course;
        a third channel course in communication with said second channel course and presenting first and second walls at a spaced-apart relationship allowing for a movement of said depressed flanges to said normal position upon user movement of said flanges from said second course into said third course;
    means for precluding removal of said flanges from said third channel course, whereupon a user rotation of said cap moves said flanges from said first channel course to said third channel course for engagement of said cap to said cover plate and about the outlet to preclude access thereto.

2. The cover as claimed in claim 1 wherein said precluding means comprises one of said channel walls in said third channel course overlying said flange to preclude withdrawal of said flange from said third channel course.

3. The cover as claimed in claim 2 wherein one of said walls in said second channel course bears against said flange in said normal position in said third channel course to preclude user induced movement of said flange from said third channel course to said second channel course.

4. The cover as claimed in claim 3 whereupon a user depression of said flange in said third channel course displaces said flange from said one of said walls in said second channel course to allow for user induced movement of said flange from said third channel course into said second channel course.

5. The cover as claimed in claim 1 wherein said flanges comprise first and second legs on opposed side of said cap, each leg having a first end connected to said cap and a second opposed movable end, said opposed end at said normal position extending beyond said cap and at said depressed position urged towards said cap.

6. The cover as claimed in claim 5 further comprising a pair of second and third slots in said cap underlying each of said legs, said legs urged within said slots at said depressed position.

7. The cover as claimed in claim 5 wherein each of said legs further comprises a foot extending from said second leg end, said foot adapted to seat within said slot.

8. The cover as claimed in claim 7 wherein one of said channel walls in said second channel course bears against said leg therein to urge said foot towards said cap.

9. The cover as claimed in claim 7 wherein said precluding means comprises one of said channel walls in said third channel course overlying said foot to preclude withdrawal of said foot from said third channel course.

10. The cover as claimed in claim 9 wherein one of said walls in said second channel course bears against said leg in said normal position in said third channel course to preclude a user induced movement of said foot from said third channel course into said second channel course.

11. The cover as claimed in claim 10 wherein user depression of said leg displaces said leg from said one of said walls in said second course to allow for user induced movement of said foot from said third channel course into said second channel course.

12. A cover device for an electrical outlet, said cover comprising:
   a cover plate adapted for attachment to an electrical outlet, said cover plate having a front surface presenting an opening for access of a plug to a socket of the electrical outlet;
   a pair of oppositely disposed slots adjacent said cover plate opening, each slot comprising:
      a first side wall adjacent an edge of said opening;
      a second side wall structure displaced from said first side wall at preselected distances to present successive first, second and third courses in each of said slots;
   a cap presenting a housing for surrounding the plug, said cap having a first open end for surrounding said opening and a second opposed end with a side wall extending therebetween;
   a pair of opposed resilient legs attached to said side wall of said cap, each leg presenting a free end for seating within one of said slots, said leg movable between a normal position displaced from said cap side wall and a depressed position towards said cap sidewall, said first course allowing for an insertion of said leg free ends therein at said normal position with said cap first end about the socket, a user rotation of said cap moving said leg free ends from said first course into said second course with said second side wall structure in said second course bearing against said legs to urge said legs towards said depressed position, a further user rotation of said cap moving said leg free ends from said second course to said third course, said third course allowing for movement of said legs from said depressed position and to said normal position, said second side wall structure in said third course maintaining said leg free ends in said third course of said slot and said cap about the socket to preclude access thereto.

13. The device as claimed in claim 12 further comprising a pair of opposed second and third slots in said cap and adjacent said legs, said legs urged into said second and third slots at said depressed position.

14. The device as claimed in claim 12 wherein said second side wall structure includes a surface extending over said third course for overlying said leg free ends, whereby to preclude withdrawal of said leg free ends from said third course.

15. The device as claimed in claim 12 whereupon a user depression of said legs and rotation of said cap moves said leg free ends from said third course into said second course.

16. The device as claimed in claim 15 whereupon a user rotation of said cap moves said leg ends from said second course to said first course whereby to remove said leg free ends from said slots.

17. The device as claimed in claim 12 wherein said second side wall structure includes a surface extending over said second course for bearing against said legs during movement of said leg free ends through said second course, said bearing of said second side wall structure urging said legs towards said depressed position.

18. The device as claimed in claim 17 wherein a portion of said second side wall structure bears against said legs when said legs are in said normal position in said third course, said bearing precluding user rotation of said cap and movement of said leg free ends from said third course to said second course.

19. The device as claimed in claim 18 wherein a user depression of said legs in said normal position in said third course frees said legs from said bearing relationship to allow for user rotation of said cap and movement of said leg free ends from said third course into said second course.

20. A housing for a connection of two wires respectively extending from a plug connected to a socket comprising:
   a first cap adapted for encircling one of the elements of a plug/socket connection, said first cap presenting first and second open ends;
   a rim about said first open end;
   a pair of oppositely disposed slots in said rim, each slot comprising:
      an inner side wall;
      an outer side wall displaced from said inner side wall at preselected distances to present successive first, second and third slot configurations between opposed ends of each of said slots;
   a second cap having first and second opposed ends, said cap adapted to surround the other element of the plug/socket connection;
   a pair of opposed resilient legs attached to said second cap, each leg presenting a lower end movable between a normal position displaced from said cap and a depressed position towards said cap, said leg lower ends insertable in said first slot configuration at said normal position, a user rotation of said second cap moving said lower leg ends into said second slot configuration with said second slot configuration urging said legs towards said depressed position, a further rotation of said cap moving said leg lower ends into said third slot configuration for movement of said depressed legs towards said normal position, said second and third slot configurations maintaining said leg lower ends in said third slot configuration, whereby to engage said first cap to said second cap and house said plug/socket connection to preclude access thereto.

* * * * *